(12) United States Patent
Golumbic

(10) Patent No.: US 6,228,926 B1
(45) Date of Patent: May 8, 2001

(54) WATER BASED PLASTICIZER FREE POLYURETHANE-WAX COATING AND REPAIR COMPOSITION AND METHOD

(76) Inventor: Harvey J. Golumbic, 24682 Santa Clara Ave., Dana Point, CA (US) 92629

( * ) Notice: Subject to any disclaimer, the term of this patent is extended or adjusted under 35 U.S.C. 154(b) by 0 days.

(21) Appl. No.: 09/459,844

(22) Filed: Dec. 13, 1999

Related U.S. Application Data

(62) Division of application No. 08/905,828, filed on Aug. 4, 1997, now Pat. No. 6,001,906.

(51) Int. Cl.⁷ ............................ C08L 91/06; C08L 75/04; B32B 27/40
(52) U.S. Cl. .................. 524/489; 524/275; 524/276; 524/487; 524/489; 524/501; 524/507; 428/423.1; 427/385.5
(58) Field of Search ..................... 524/104, 275, 524/276, 478, 479, 480, 487, 488, 489, 507, 591; 428/423.1, 423.4, 424.6; 427/385.5, 389, 393.5

(56) References Cited

U.S. PATENT DOCUMENTS

| | | | |
|---|---|---|---|
| 3,597,373 | 8/1971 | Bregoff et al. | 524/32 |
| 3,620,865 | 11/1971 | Golumbic | 156/98 |
| 4,013,495 | 3/1977 | Golumbic | 156/98 |
| 4,028,160 | 6/1977 | Golumbic | 156/98 |
| 4,301,053 | 11/1981 | Wolfrey | 524/104 |
| 4,306,998 | 12/1981 | Wenzel et al. | 524/37 |
| 4,337,183 | 6/1982 | Santiago | 524/446 |
| 4,554,083 | * 11/1985 | Soldenski et al. | 524/104 |
| 4,576,987 | 3/1986 | Crockatt et al. | 524/487 |
| 5,439,969 | 8/1995 | Sanduja et al. | 524/507 |
| 5,538,717 | * 7/1996 | La Poterie | 524/507 |
| 5,679,505 | * 10/1997 | Tingler et al. | 430/523 |
| 5,702,809 | * 12/1997 | Tixier et al. | 524/591 |
| 5,968,655 | * 10/1999 | Hartung et al. | 427/407.1 |

* cited by examiner

Primary Examiner—Peter Szekely
(74) Attorney, Agent, or Firm—John J. Connors; Connors & Associates

(57) ABSTRACT

A coating composition comprising a colloid of a thermoplastic, elastomeric polyurethane and a wax dispersible in water is applied to the surface of a substrate, drying rapidly to form a tough, durable, protective film bonded firmly to the surface.

4 Claims, No Drawings

WATER BASED PLASTICIZER FREE POLYURETHANE-WAX COATING AND REPAIR COMPOSITION AND METHOD

RELATED APPLICATION

This application is a divisional of U.S. patent application Ser. No. 08/905,828, filed Aug. 4, 1997, entitled Water Based Plasticizer Free Polyurethane-Wax Coating & Repair Composition & Method, now U.S. Pat. No. 6,001,906, which is incorporated herein by reference and made a part of this application.

BACKGROUND OF THE INVENTION

1. Field of the Invention

This invention relates to a non-toxic, water-based coating composition which, when applied to the surface of a substrate, particularly leather and vinyl materials, dries rapidly to provide a tough, protective film bonded firmly to the surface. This invention also relates to the method of using this coating composition.

2. Background Discussion

It is desirable to apply protective coatings to a wide variety of materials. For example, vinyl or leather upholstery for furniture and automobiles, articles of clothing like shoes and jackets, and objects such as purses, wallets, etc. all have an enhanced appearance if coated with a liquid which forms a durable film after evaporation of the carrying agent for the film forming material. U.S. Pat. No. 3,597,373 illustrates a typical coating composition which uses hydrocarbon solvents for the film forming material. These solvents are irritating to skin and mucus membranes, or even toxic upon prolonged exposure. Another disadvantage of hydrocarbon solvent based resin coatings is that the film formed tends to be inflexible. To overcome this, plasticizers are blended in the coating. These plasticizers migrate from the film over a period of time and may leave on the surface of the film a sticky, oily residue. Expensive blocking agents are used to inhibit the migration of the plasticizers from the film' surface. Eventually, the film becomes brittle when the plasticizers have volatized or have been transferred due to contact with other substrates and are no longer present in a sufficient amount to maintain the desired flexibility. Antioxidants are used in hydrocarbon solvent based resin coatings to speed drying and prevent decomposition of the film by air oxidation. Stabilizers are also used in hydrocarbon solvent based resin coatings to impart ultraviolet light resistance to both the coating and the resulting film. These are expensive and sometimes toxic ingredients.

SUMMARY OF THE INVENTION

This invention provides a coating composition which uses water as the carrying agent for the film forming material, and thereby avoids the problems associated with hydrocarbon based coatings. Moreover, a resin, or mixture of resins, is used as the film forming material which has the proper flexibility and abrasion resistance for the application without the need for inclusion of plasticizers into the coating. It has been found that a mixture of resins is desirable in some circumstances to tailor the coating composition to the particular application. For example, a coating applied to vinyl automobile upholstery must be more durable and tougher than a coating for hand bags and gloves.

The coating composition of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its advantages, which include high impact and abrasion resistance, excellent elongation and flexibility, outstanding stain and chemical resistance, early film integrity, fast dry-to-handle properties, air drying, outstanding toughness, excellent adhesion to heat and solvent sensitive substrates, compatible with anionic pigments and dispersing agents, water thinnable, suitable for white and light pastel shades, usable as primer and topcoat, stable to repeated freeze/thaw cycles, low solvent content, non-flammable, water clean-up, non-toxic, creates a high heat resistance barrier, high gloss, if desired, and is safe to use.

Briefly, this invention is a non-toxic, water-based, colloidal composition including a thermoplastic, elastomeric polyurethane and wax dispersed in water. After evaporation of the water carrying agent, the polyurethane and wax combine to form a tough film bonded to the surface of the substrate to which the coating composition is applied. The coating, in some instances, is absorbed by leather substrates, and this tends to improved the bond between the film and the substrate.

The composition may clear or pigmented, that is transparent or translucent or opaque. A major portion of solids present in the composition are polyurethane and a minor portion of solids present in the composition are wax. The polyurethane is the principal film forming ingredient, and the wax adds mar resistance to the film. It is believed that the polyurethane and wax interact synergistically to provide a barrier for a substrate which unexpectedly has a high heat and abrasion resistance and, high gloss, when desired. The film formed on, for example, vinyl or leather, creates a high heat resistant barrier. The film without flattening agents has a high gloss. This combination of polyurethane and wax is mainly responsible for the desirable attributes of this invention.

The composition is applied as a coating to the surface of a substrate, and dries rapidly in air at ambient temperatures and pressures, filling any cracks in the surface, to form a tough, durable film that is bonded firmly to the surface. At cold ambient temperatures or high humidity conditions, hot air may be used to speed the rate of drying. It may be used to coat such materials as, for example, leather, vinyl polymers, flexible and semi-rigid plastics, rubber, polycarbonate, reaction-injection molding compound, thermoplastic polyurethane, acrylonitrile-butadient-styrene, wood, aluminum, and galvanized metal.

A dispersing agent, a water soluble leveling agent, and a defoaming agent may also be present in the composition. The dispersing agent is present in the composition in an amount ranging between about I and about 30 weight percent. The dispersing agent insures that the polyurethane is uniformly distributed as tiny, solid particles which remain in suspension. The preferred dispersing agent is N-methylpyrrolidone. The ratio of water to dispersing agent in the composition is from 20/80 to 10/90 by volume. The leveling agent is a surfactant which insures that the film formed upon drying is integral, uniform, and substantially free of discontinuities such as picture framing, edgepull, pin holes, cratering, and fish eyes. The leveling agent is present in an amount ranging from about 0.05 to about 6 weight percent. One suitable leveling agent is a mixture of polyfunctional complex organic compounds in 2-butoxy ethanol.

The defoaming agent stops the formation of bubbles during blending of ingredients that would hamper the formation of the desired uniform, integral film. The defoaming agent is present in an amount sufficient to suppress foaming, typically in an amount ranging from 0.05 to 6 weight percent.

A polyurethane colloid is used as the principal ingredient of the composition of this invention. One of the desirable features of the polyurethane used in this invention is that it forms a flexible film. This imparts pliability to the substrate, tending to restore its original hand. Hand is the aesthetic feel of the surface of the substrate. The coating of this invention produces a treated substrate that has a hand which approaches the original, untreated substrate. A characteristic of the polyurethane film is that its has a percent elongation in the range between about 150 and about 700.

The polyurethane used is a fully reacted polyurethane elastomer with no free isocynate, is hydrolytically stable, and when completely dry, does not redissolve in water. The polyurethane is preferably present in the composition in an amount ranging from 20 to 55 weight percent. Preferably, it is an aliphatic polymer having a average molecular weight, calculated on the basis of the gel permeation chromatographic method, ranging from 50,000 to 100,000. Although an aromatic polymer may be used, the film tends to yellow or darken over time, and consequently, an aromatic polymer is unsuitable when a clear, transparent film is desired. The particles of polyurethane vary widely in size, but the major portion range between about 200 and about 800 microns.

In accordance with one feature of this invention, the coating composition is designed to be more rougher or more flexible depending in the intended application. A blend of a base polyurethane having an elongation of approximately 400 percent is mixed with either (1) a relatively hard polyurethane having an elongation of approximately 150 percent or (2) a relatively soft polyurethane having an elongation of approximately 700 percent depending on the application. The base polyurethane alone was found to be suitable for many applications, but was not tough enough when used, for example, with automobile vinyl or leather upholstery or was not flexible enough when used on, for example, clothing. To make the film tougher, a blend comprising of this base polyurethane and the less flexible but tougher polyurethane was used. Conversely, to make the film more flexible, a blend comprising of this base polyurethane and the more flexible but less tough polyurethane was used.

The wax is dispersed in water and then this dispersion is blended with the polyurethane colloid. The particles of wax vary widely in size, but the major portion range between about 10 and about 50 microns. Preferably, a wax emulsion is employed. The wax comprises from 20 to 40 weight percent of the aqueous dispersion or emulsion. The co-solvants may be used to reduce or extend the drying times. After blending with the polyurethane colloid to form the composition of this invention, the wax is present in the composition in an amount ranging from about 1 to about 5 weight percent, and comprises between about 0.5 and 4 weight percent of the total solids. The wax has a softening point ranging between about 180 to about 290 F, and a hardness ranging typically between about 0.5 and about 4.0, according to American Standard Testing Materials Procedure ASTM-D5. Very hard waxes, for example waxes with a hardness of about 0.5, significantly reduce gloss. Surprisingly, such waxes when used in the composition of this invention do not impair gloss, and the film formed upon evaporation of the water provides a high gloss appearance. A suitable wax is a polyethylene having a average molecular weight, calculated on the basis of the gel permeation chromatographic method, ranging between about 6000 and about 11,000 and a pH of about 9 to about 11. Other suitable waxes are halogenated polyolefins.

Other ingredients may include co-solvents, flattening agents, rheology control compounds, mar resistant additives such as a silicone polymer or a fluorocarbon polymer, acrylic resins, and dyes or pigments. The co-solvents extend drying times, which may be desirable in some applications, and improve substrate wetting. Suitable co-solvents are, for example, short chain ketones such as acetone which will reduce the dry time, N-methypyrrolidone, ethylene glycol, and propylene glyol. The flattening agents may be used to diminish the glossy appearance of the film, and preferably are colloidal silicas or platey talc. The rheology control compounds improve lay down of the film and the dispersion of the dyes and color pigments so that settling is reduced. A suitable rheology control compound is ethyl acrylate acrylic emulsion copolymer. The rheology control compound has a high solids content typically from about 30 to about 50 weight percent and is on the acidic side having a pH typically ranging from 2.2 to 3.5. Water borne acrylic resin may be added to reduce the cost. In accordance with one feature of this invention, the composition is essentially free of plasticizers and antioxidants as separate additives.

If the film is exposed for prolonged periods of time to sun light, it may be desirable to blend with the composition ultraviolet light stabilizers. In many situations, however, such ultraviolet light stabilizers are unnecessary. Therefore, the composition may also be essentially free of ultraviolet light stabilizers as separate additives.

This invention includes a method of protecting the surface of a substrate, comprising:

(1) applying to the surface a thin coating of the water-based, colloidal coating composition, and (2) drying the coating to evaporate the water, so that a tough, durable film is formed on the surface which is bonded firmly to said surface.

This invention also includes the product coated with the composition of this invention. Such product comprises a substrate having a surface covered by a solid, thin barrier which adheres firmly to the surface and is formed upon evaporation of water after the application of a non-toxic, water-based, colloidal coating composition including a thermoplastic, elastomeric polyurethane and wax dispersible in water. The film has a thickness ranging between about 5 and about 100 microns.

DESCRIPTION OF THE PREFERRED EMBODIMENTS

The following lists the main ingredients of the preferred coating composition of this invention, and their sources.

I. RESIN COLLOID

The resin colloid is a dispersion of polyurethane in water using N-methylpyrrolidone as the dispersing agent. The best material discovered for use in the coating composition of this invention is SPENSOL® L-53 Resin (Reichold Chemicals, Inc). It is an aliphatic, anionic, colloidal, water dispersion of thermoplastic urethane polymers using N-methylpyrrolidone. The polyurethane is present as solid particles suspended in water, with the following particle sizes:

10% less than 190 microns

5% less than 390 microns

90% less than 810 microns

| Typical Resin Colloid Analysis | |
|---|---|
| Percent solids by weight | 30.00 |
| Viscosity at 25 C. | 0.50 |
| Stokes Specific Gravity | 1.04 |
| Pounds/Gal Solution | 8.70 |
| Pounds/Gal Solids | 9.70 |
| pH | 8.00 |
| Solvents Water/NMP | 82/18 |

II. WAX & ADDITIVES

The preferred wax is a polyethylene wax which may be used alone or in combination with silicone or fluorochemical surfactants. The following are suitable waxes:

1. Wax Dispersions such as:
   a. polyethylene wax UCD 21160 (Universal Color Dispersions) a division of Morton Chemicals, Inc.
   b. polyethylene and synthetic waxes SLIP-AYD® SL Series (Daniel Products Co.)
   c. 2707 Wax polyethylene wax (RBH Dispersions Inc.)
2. Wax Emulsions such as:
   a. Michem Polymer Emulsions (Various types available from Michelman Chemical Inc.)
   b. Jonwax 26 & 120 (Johnson Wax—S. C. Johnson & Son)
3. Powdered Wax such as:
   a. S-681, polyethylene, S-368 polyethylene, and SST-3, PTEF (Teflon), (Shamrock Chemical Corp.)
   b. MP-22XF, synthetic paraffin, Aquapoly blend of PTFE and hydrocarbon 250, and Polysilk-14, a blend of fluorocarbon and hydrocarbon powders (Micro Powders, Inc.)
4. Mar Resistant Silicone & Fluorochemical additives such as:
   a. a polyether modified dimethylpolysiloxane copolymer BYK® 301,306,321 (Byk Chemie, USA)
   b. a nonionic fluorosurfactant of the polyoxyethylene type LODYNE™ S-107B (Ciba-Geigy Corp.)
   c. FC-129 and FC-430 (3M Corp.)

III. FLOW CONTROL AGENTS

The flow control agents are surfactants such as:

1. a dioctyl sodium sulfo-succinate in petroleum distillate AEROSOL® OT-S (American Cyanamid Co.)
2. a mixture of 2,4,7,9-tetra methyl-5-decyne-4,7-diol and ethylene glycol SURFYNOL® 104 Series (Air Products & Chemicals, Inc.)
3. a polyether modified dimethylpolysiloxane copolymer BYK® Byk 301,306,321 (Byk-Chemie, U.S.A.)
4. a nonionic fluorosurfactant of the polyoxythylene type LODYNE™ S-107B (Ciba Geigy Corp.)
5. a fluorochemical with a hydrocarbon tail and a solubilizing group attached to the tail FLUORAD™ FC-129 and FC-430 (3M Corp.)
6. propylene glycol methyl acetate in a solvent FCABA (Paint Chemicals, Inc.)
7. glycol ether proprietary blend WRACLA (Paint Chemicals, Inc.)
8. WRAPA (Paint Chemicals, Inc.)

IV. DEFOAMERS

1. Foam Master 111, NXZ and VL (Henkel Corp/Coatings Chemicals)
2. Drewplus L447, 464 and 405 (Drew Industrial Div. Ashland Chemical Co.)
3. Nalco 2300, 2309 and 2343 (Nalco Chemical).
4. Colloid 679,999 and 639AA (Colloids, Inc.)
5. an antifoam/defoamer DEE FO™ PI-3 (Ultra Additives, Inc.)
6. a silicone-free foam suppressor DAPRO™ DF 900, DF911 (Daniel Products Co.)

V. PRE-DISPERSED COLORS

Suitable coloring agents are any water thinnable pigment concentrates, for example, the acrylic based color concentrates such as:

1. Sup-R-Conc L Series (Hilton-Davis Chemical Co.)
2. 888 (Colortrend) Series (HULS, Inc.)
3. Aurasperse

VI. RHEOLOGY CONTROL COMPOUNDS 1. a hydroxyethyl cellulose CELLUSIZE™ QP4400 and QP-1500 (Union Carbide Corp)
2. an acrylic alkali soluble emulsion ACRYSOL™ GS, RM5, ASE-60 and ASE-95, QR-708 (Rohm & Haas Co.)
3. Bentone EW and LT, clays, (Rheox Inc.)
4. POLYOX™ WSR, polyethylene oxide Series (Union Carbide Corp.)
5. an in-situ thickener ALCOGUM® L37, sodium polyacrylate (Alco Chemical)
6. UCAR SCT-200, SCT 270 proprietary (Union Carbide)

EXAMPLE

A typical coating composition of this invention is made utilizing 93.28 gallons of the resin colloid SPENSOL® L-53 made by Reichold Chemicals Company. To this is blended 3.34 gallons of the polyethylene wax dispersion UCD 21160 made by Morton Chemicals. The mixture is stirred vigorously to completely mix the wax dispersion with the colloid. The mixture is diluted with 1.55 gallons of water, and to this mixture is added 0.83 gallons of the defoamer DAPRO™ DF 900 (Daniel Products Co.), 0.25 gallons of the flow control agent FCABA (Pain Chemicals, Inc.) and 0.50 gallons of the flow control agent WRACLA (Pain Chemicals, Inc.), and 0.25 gallons of the rheology control compound ALCOGUM® L-37 (Alco Chemicals). The mixing of the ingredients is conducted at ambient temperature and pressure.

Preparation of Leather or Vinyl Material

The surface of the substrate material should be free of all silicones, waxes, grease, oil, or dirt which would prevent or impair the coating composition from forming the desired tough, durable protective film on the surface of the leather and vinyl material. Conventional solvents and degreasing detergents may be used to prepare surface for proper wetting by the coating composition. In some cases where the surface has heavy coating of contaminates, 0000/steel wool may be used in conjunction with a solvent or degreaser. The surface should be wiped clean before application of the coating composition, and the solvents or degreasers must not leave any residue. Minor surface damage consisting of small cuts, holes, nicks, etc. may be filled with small amounts of the coating composition and allowed to dry to the touch. If the cut has penetrated the surface, for example creating a flap, then the flap should be glued down using the coating composition, pressing the flap in place until the composition has set. The composition preferably is applied by spray, brush or sponge foam applicator. A roller, rubber or plastic spread applicator may leave undesirable surface texture. The coating composition should be applied in one direction to avoid re-wetting the semi-dried coating and causing surface imperfections. When dry to the touch, additional coatings can be applied in other directions to provide better coverage and a more uniform protective film on the surface.

Application of Coating

One easy way to use the coating composition, for instance, is to dip a sponge (No. 1 Latex) in the composition of the EXAMPLE an apply over the surface of, for example leather, as a thin film. The coating preferably should be laid down in a single pass. If additional coats are desired the previous coating should be allowed to air dry, which ordinarily takes only from about 2 to 60 minutes depending on ambient conditions. The evaporation of the water results in the formation of a tough, durable film which adheres to the surface of the substrate. Typical properties of this film are:

| Film Properties | |
| --- | --- |
| Tack-free Time (minutes) | 130 |
| Dry-Hard Time (minutes) | 200 |
| Sward hardness one day/7 days | 10/18 |
| Modulus (psi) 100% | 1000 |
| Tensile Strength (psi) | 5600 |
| Tear Strength (ph) | 250 |
| Percent Elongation | 400 |
| Abrasion Resistance | 15 |
| (Taber) CS17 Wheels 1000 Gram load (cycles) | 1000 |
| Shore Hardness (AID) | 85/40 |

CHARACTERISTICS OF FORMULATION

The film's flexibility may be modified to make the film stiffer or softer by blending different types of polyurethanes. The higher the percent elongation of the polyurethane film, the softer the film covering the substrate, and vice versa. The following illustrates ranges of ingredients which are typically used in preparing coatings which impart different hand characteristics to the substrate. Starting with the polyurethane colloid SPENSOL® L53 (Reichold Chemicals) various additives as listed below may be added to create coatings which provide films having different hand characteristics for different applications. For example, it would be desirable to have a soft hand when coating glove leather, and a stiffer hand when coating automobile upholstery.

| Ingredient | Minimum/ Maximum Ranges (wt %) | Characteristics |
| --- | --- | --- |
| 1. Water | 0 to 5% (Tap) | Reduces viscosity at higher levels and requires additional additives due to increase surface tension. |
| 2. Polyethylene Wax | 0.25 to 6% | Lower levels will improve flexibility with loss of mar and abrasion resistance. Higher levels will cause loss of flexibility and adhesion. |
| 3. Defoamer | 0.25 to 6% | DAPRO ™ DF-900 (Daniel Products) Lower levels will not reduce foam. Higher levels will cause loss of adhesion and film integrity. |

-continued

| Ingredient | Minimum/ Maximum Ranges (wt %) | Characteristics |
| --- | --- | --- |
| 4. Flow Control Agent | 0.25 to 6% | FCABA (Paint Chemicals) Flow control will not be enhanced at low levels. High levels will cause loss of adhesion and film integrity. |
| 5. Leveling Agent | 0.25 to 6% | WRACLA (Paint Chemical) Anti-cratering leveling agent will not be enhanced at low levels. High levels will cause loss of adhesion and film integrity. |
| 6. Rheology Control Agent | 0.00 to 10% | ALCOGUM ® L37 (Alco Chemicals) Low levels will allow pigments to settle. High levels will cause coating to gel. |
| 7. Co-solvents | 0.00 to 6% | Needed only to improve substrate wetting and to adjust evaporation rate, if necessary. |
| 8. Flatting Agents | 0.00 to 15% | For gloss control. Higher levels will affect flexibility, adhesion and film integrity. |
| 9. Pigments | | As needed to provide coloring. |
| 10. Acrylic Resins | 0.00 to 40% | RHOPLEX ™-MU23, MU-9 (Rohm & Haas). NEOCROYL ™ 601 (Polyvinyl Chemical). CARBOSET ™ 514H (B.F. Goodrich) AROLON ™ 820-W-491820-W-39 (Richold Chemicals) Used for cost savings and possible adhesion enhancement. Under some conditions may require adjustments of additives to compensate for reduced flexibility. |
| 11. Polyurethane Blend | 0.5 to 25% | SPENSOL ® L55 or L56 (Reichold Chemical) Can be used to modify L-53 to increase flexibility and improve softness (hand) where abrasion and mar resistance is not a major factor. |

Repeated testing has demonstrated that there is more than one preferred formula and that a range of resin mixes must be used depending on the type of substrate and its application. For example, when refinishing heavy wear areas, it is advantageous to add a harder polymer to the standard coating which would be used in the majority of applications. The addition of the polymer will enhance the durability of the coating by increasing the slip and help in preventing tearing and delamination due to hard impact and repeated contact at, or wear on, the same spot.

The addition of acetone (dimethyl ketone) will enhance bonding and penetration of the substrate, especially of non-porous surfaces. When refinishing extremely flexible substrates, an addition of a highly flexible resin will help in maintaining long term flexibility and soft "hand". Experimentation has determined that a particular coating's maximum performance is a function of usage and type of substrate. Examples of three types of formulations that exhibit desired results in the following applications that exhibit desired results in the following applications:

| Automotive leather upholstery | |
|---|---|
| SPENSOL ® L-53 | 74.5 gallons |
| SPENSOL ® L-51 | 20.0 gallons |
| Polyethylene wax | 3.0 gallons |
| Water | 1.0 gallons |
| DAPRO ™ DF-900 | 0.8 gallons |
| WRACLA | 0.5 gallons |
| ALCOGUM ® L-37 | 0.2 gallons |
| | 100.0 gallons |
| Household Furniture | |
| SPENSOL ® L-53 | 94.5 gallons |
| Polyethylene wax | 3.0 gallons |
| Water | 1.0 gallons |
| DAPRO ™ DF-900 | 0.8 gallons |
| WRACLA | 0.5 gallons |
| ALCOGUM ® L-37 | 0.2 gallons |
| | 100.0 gallons |
| Clothing, Shoes and Accessories | |
| SPENSOL ® L-53 | 55.0 gallons |
| SPENSOL ® L-56 | 40.0 gallons |
| Polyethylene wax | 2.5 gallons |
| Water | 1.0 gallons |
| DAPRO ™ DF-900 | 0.8 gallons |
| WRACLA | 0.5 gallons |
| ALCOGUM ® L-37 | 0.2 gallons |
| | 100.0 gallons |

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A product comprising
   a substrate having a surface covered by
      a solid, thin film which adheres firmly to the surface and is formed upon evaporation of water after the application of a non-toxic, water-based, colloidal coating composition which is essentially free of plasticizers as separate additives, said film consisting essentially of a wax having a softening point between 180° and 290° F. and a thermoplastic, elastomeric polyurethane which is a blend of at lest two polyurethanes including a base polyurethane having an elongation of approximately 400 percent mixed with either (1) a relatively hard polyurethane having an elongation of approximately 150 percent or (2) a relatively soft polyurethane having an elongation of approximately 700 percent depending on the application,
   said film having a thickness ranging between 5 and 100 microns.

2. A coating composition which is essentially free of plasticizers as separate additives and consists essentially of from 20 to 55 weight percent of a thermoplastic, elastomeric polyurethane, from 1 to 5 weight percent of a wax dispersible in water and having a softening point between 180 and 290 F, from 1 to 30 weight percent of a dispersing agent, and the balance water where the ratio of water to dispersing agent is from 20/80 to 10/90 by volume, said polyurethane being a blend of at least two polyurethanes with substantially different elongations.

3. A method of protecting the surface of a substrate, comprising:
   applying to said surface a thin coating of a water based, colloidal coating composition which is essentially free of plasticizers as separate additives, and
   drying the coating to evaporate the water, so that a film is formed on the surface which is bonded firmly to said surface and has a thickness ranging between 5 and 100 microns,
   said film consisting essentially of a thermoplastic, elastomeric polyurethane and a wax dispersible in water having a softening point between 180 and 290 F, said elastomeric polyurethane being a blend of at least two polyurethanes with substantially different elongations.

4. The method of claim 3 where the blend of at least two polyurethanes includes a base polyurethane having an elongation of approximately 400 percent mixed with either (1) a relatively hard polyurethane having an elongation of approximately 150 percent or (2) a relatively soft polyurethane having an elongation of approximately 700 percent depending on the application.

* * * * *